Feb. 4, 1958  E. F. RUSCH  2,821,883
PROJECTION SCREEN CONSTRUCTION
Filed Feb. 17, 1956
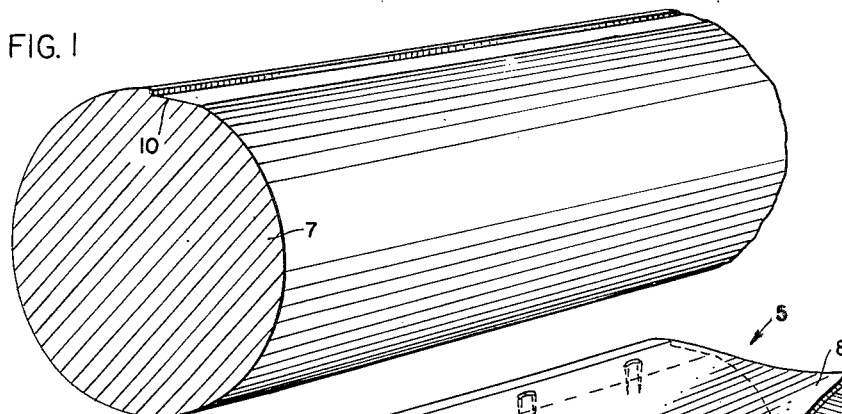
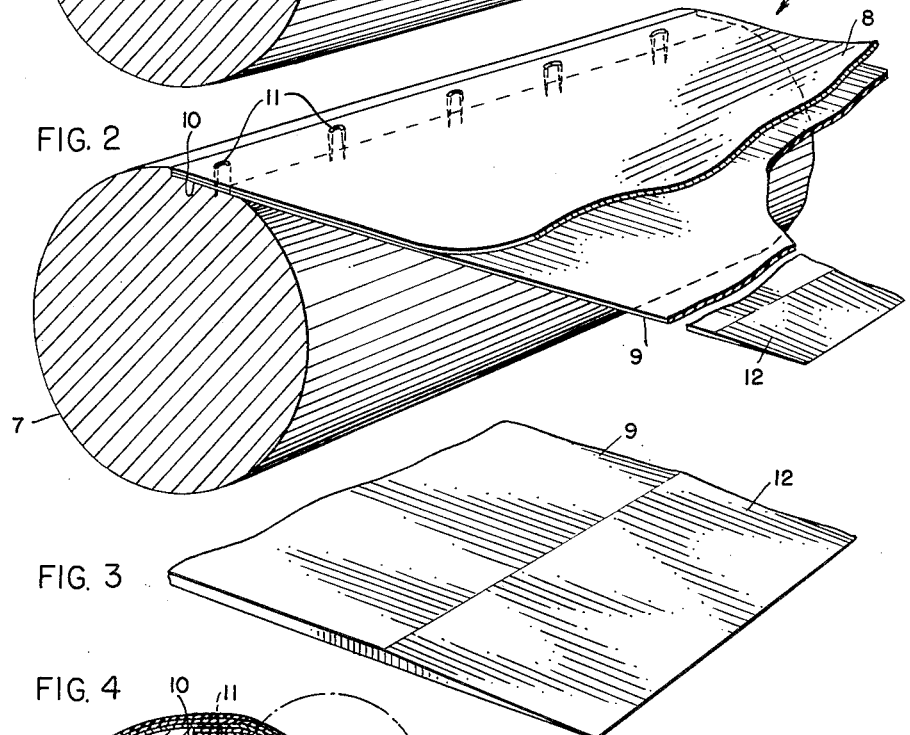
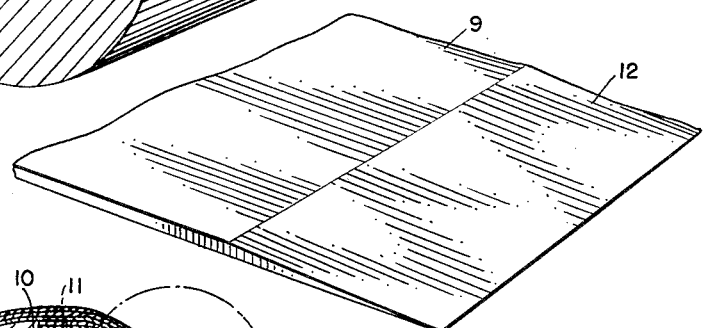
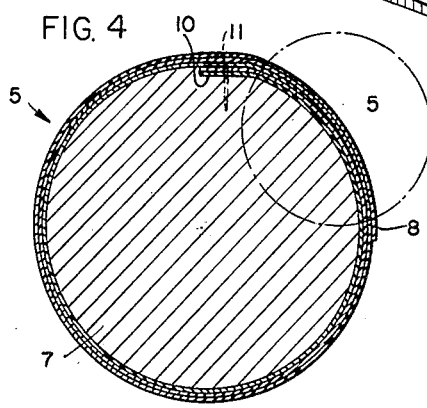
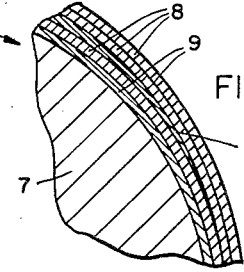
INVENTOR:
EDWARD F. RUSCH
BY
ATT'YS

United States Patent Office 2,821,883
Patented Feb. 4, 1958

2,821,883

PROJECTION SCREEN CONSTRUCTION

Edward F. Rusch, Cicero, Ill., assignor to Da-Lite Screen Company, Inc., Chicago, Ill., a corporation of Illinois Application February 17, 1956, Serial No. 566,167

1 Claim. (Cl. 88—28.91)

This invention relates to projection screens of the type which, when not in use, are stored up on a roller.

The screen, on which the images are cast from a projector, is usually a silver-coated vinyl-film composition, but several other silver-coated screen surfaces are also used. The spring loaded roller on which this film sheet is wound, almost invariably, is made of wood. Not infrequently the periphery of the roller is not too carefully machined. Accordingly, the surface of the roller may be a bit rough in spots, even have some ridges, bumps, or depressions. This vinyl-film composition, approximately .015" thick, is very pliable and impressionable. Were it wound directly onto the wood rollers, such a film would be impressed with and have its otherwise very smooth surfaces distorted by the rough places on the roller. To obviate that possibility I underlay the screen film with a backing sheet.

Such backing sheet is formed of paper stock about half as thick as the vinyl-film, that is approximately .007". It is of a length such that when wound around the roller it overlaps and extends a short distance beyond the point of attachment of the inner edges of the film and backing to the roller ledge.

If the comparatively abrupt termination of the free end of such backing sheet were used it would create a ridge longitudinally of the roller on which such a backing sheet and film screen are wound. In the course of time, the pressure of the several convolutions of the film screen and the tension caused by the usual spring loaded roller tends to accommodate the successive layers of the pliable and impressionable material to the ridge-forming terminus of the backing sheet. As a consequence a series of deformations would be formed transversely of the screen. When the screen is unreeled for use these deformations tend to produce annoying distortions of the image projected onto the screen along such areas. When colored slides or film are projected on a screen surface it must be smooth and taut in order to present a clear undistorted picture.

The main object of this invention, therefore, is to provide an improved form of backing sheet for a roll-up projection screen which will eliminate all possibility of the deformation of a viewing surface of the screen, particularly a vinyl-film screen surface which is silver coated; and to provide a constant smooth surfaced projection screen where the screen is of the roll-up type.

One embodiment of this invention is shown in the accompanying drawings, in which:

Fig. 1 is an enlarged, perspective view of a section of a wood roller, such as is generally used for coiling up projection screens, the view showing the ledge that is formed longitudinally thereto to provide for the recessed attachment of the inner ends of the screen and its backing sheet;

Fig. 2 is an enlarged, transverse section of a screen roller showing the ends of the screen and backing sheet stapled to the roller along the recessed ledge;

Fig. 3 is a further enlarged, perspective of a fragment of an improved form of backing sheet constructed in accordance with this invention; and Fig. 4 is an enlarged, transverse, sectional view of a roller with several convolutions of the screen thereon;

Fig. 5 is a magnified fragment of Fig. 4 illustrating how the tapered edge of the backing sheet, constructed in accordance with this invention, eliminates the abrupt ridge or deformation at the end of the backing sheet.

The essential concept of this invention involves so forming a taper along the free edge of a backing sheet as to present a very gradual reduction in the thickness of the overlapping portions of the backing sheet adjacently beyond the point of attachment of the screen and backing sheet to the roller, thereby eliminating the ridge which has heretofore been formed by the conventional square-ended backing sheet.

A projection screen assembly embodying the foregoing concept comprises a roller 7 whereon is wound the silver-coated vinyl film 8 and which is underlaid with a backing sheet 9.

Characteristic with the conventional projection screen assembly, the roller 7 is made of wood. Longitudinally the periphery is recessed to form a ledge 10 whereto the overlapping ends of the backing sheet 9 and the screen film 8 are attached by suitable fasteners 11, as, for example, staples.

Although not here shown, one end of the roller 7 is hollowed out to provide for the housing of a torsion spring, of the kind conventionally used on window-shade rollers. The ends of the roller 7 mount the conventional fixtures (not here shown) whereby the roller is suspended from the conventional brackets secured to a suitable supporting frame, also not here shown. See for example Patent No. 2,391,686 issued April 8, 1952 to Du Mais et al.

For projection equipment of this kind, the screen 8 generally is a very impressionable and pliable vinyl film. One face is silvered in the usual manner.

The backing sheet 9, in accordance with this invention, is formed with a taper 12 of considerable width inwardly from the free edge of the backing sheet 9. One of the most practical ways of achieving this kind of a taper is to "skive" the paper by running along, what is to be the free edge of the backing sheet when placed on the roller 7, an appropriately-formed and disposed sanding drum. By such a means the surface of the paper is cut away gradually to a feather edge for about three-quarters of an inch or an inch inwardly from the free edge.

As Fig. 3 so clearly illustrates, the use of such a feather-edged backing sheet, when wound around the roller, terminates so gradually that it precludes the formation of any kind of a ridge at the terminus of that part of the backing sheet that overlaps the initial convolution, which characterizes the conventional projection screen. There being no ridge at the terminus of the overlapping convolution of the backing sheet, the several convolutions of the screen 8 cannot be distorted along the overlap of the backing sheet. Consequently, there will be no creases or other deformations appearing in the screen when it is unreeled for projecting images thereon.

Generally, the width of the backing sheet is equal to the circumference of the roller plus approximately 20% additional for overlap, of which latter amount substantially 75% is tapered or skived from the full thickness of the sheet to a feather edge.

Although but one specific embodiment of this invention is herein shown and described it is to be understood that numerous details may be altered or omitted without departing from the spirit of this invention as defined by the following claim.

I claim:

A projection screen comprising, a roller peripherally recessed to form a flat ledge inwardly terminating at a normally-disposed longitudinally-extending radial ridge and outwardly merging with the roller periphery circumferentially of the ridge, and a superimposed silver screen and backing sheet of a combined thickness equal to the radial dimension of the ridge and secured to the ledge with the ends of the screen and sheet abutting the ridge, the backing sheet being of a width not less than the circumference of the roller and formed with a long-angled taper for a material distance inwardly from its free edge.

References Cited in the file of this patent

UNITED STATES PATENTS

| | | |
|---|---|---|
| 635,070 | Edmiston | Oct. 17, 1899 |
| 707,289 | Weston | Aug. 19, 1902 |
| 1,003,593 | Gammeter | Sept. 19, 1911 |
| 1,576,588 | Finstone | Mar. 16, 1926 |
| 1,917,369 | Heck | July 11, 1933 |
| 1,923,506 | Rice | Aug. 22, 1933 |
| 2,714,493 | Gramp | Aug. 2, 1955 |

FOREIGN PATENTS

| | | |
|---|---|---|
| 645,306 | Great Britain | Oct. 25, 1950 |